US008880696B1

(12) United States Patent
Michels

(10) Patent No.: US 8,880,696 B1
(45) Date of Patent: Nov. 4, 2014

(54) METHODS FOR SHARING BANDWIDTH ACROSS A PACKETIZED BUS AND SYSTEMS THEREOF

(75) Inventor: Tim S. Michels, Greenacres, WA (US)

(73) Assignee: F5 Networks, Inc., Seattle, WA (US)

( * ) Notice: Subject to any disclaimer, the term of this patent is extended or adjusted under 35 U.S.C. 154(b) by 213 days.

(21) Appl. No.: 12/685,901

(22) Filed: Jan. 12, 2010

Related U.S. Application Data

(60) Provisional application No. 61/145,475, filed on Jan. 16, 2009.

(51) Int. Cl.
*G06F 15/173* (2006.01)

(52) U.S. Cl.
USPC ........................................ 709/225

(58) Field of Classification Search
CPC ... G06F 13/28; G06F 13/287; G06F 2213/28; G06F 12/0835
USPC .......................................... 709/225, 230, 246
See application file for complete search history.

(56) References Cited

U.S. PATENT DOCUMENTS

| | | | |
|---|---|---|---|
| 5,388,237 A * | 2/1995 | Sodos | 710/22 |
| 5,742,765 A * | 4/1998 | Wong et al. | 709/230 |
| 5,761,534 A * | 6/1998 | Lundberg et al. | 710/50 |
| 5,797,033 A * | 8/1998 | Ecclesine | 710/22 |
| 5,828,835 A | 10/1998 | Isfeld et al. | |
| 5,941,988 A | 8/1999 | Bhagwat et al. | |
| 6,026,443 A | 2/2000 | Oskouy et al. | |
| 6,115,802 A | 9/2000 | Tock et al. | |
| 6,529,508 B1 | 3/2003 | Li et al. | |
| 6,700,871 B1 | 3/2004 | Harper et al. | |
| 6,748,457 B2 | 6/2004 | Fallon et al. | |
| 6,781,990 B1 | 8/2004 | Puri et al. | |
| 6,820,133 B1 | 11/2004 | Grove et al. | |

(Continued)

FOREIGN PATENT DOCUMENTS

| | | |
|---|---|---|
| EP | 1813084 A1 | 8/2007 |
| WO | 2006/055494 A1 | 5/2006 |

OTHER PUBLICATIONS

"Gigabit Ethernet/PCI Network Interface Card; Host/NIC Software Interface Definition," Jul. 1999, pp. 1-80, Revision 12.4.13, P/N 020001, Alteon WebSystems, Inc., San Jose, California.

(Continued)

*Primary Examiner* — Jason Recek
(74) *Attorney, Agent, or Firm* — LeClairRyan, a Professional Corporation

(57) ABSTRACT

A system, method, and computer readable medium for sharing bandwidth among executing application programs across a packetized bus for packets from multiple DMA channels includes receiving at a network traffic management device first and second network packets from respective first and second DMA channels. The received packets are segmented into respective one or more constituent CPU bus packets. The segmented constituent CPU bus packets are interleaved for transmission across a packetized CPU bus.

34 Claims, 9 Drawing Sheets

(56) References Cited

U.S. PATENT DOCUMENTS

| | | | |
|---|---|---|---|
| 7,065,630 | B1 | 6/2006 | Ledebohm et al. |
| 7,107,348 | B2 | 9/2006 | Shimada et al. |
| 7,117,308 | B1* | 10/2006 | Mitten et al. .................. 711/118 |
| 7,142,540 | B2 | 11/2006 | Hendel et al. |
| 7,236,491 | B2 | 6/2007 | Tsao et al. |
| 7,281,030 | B1 | 10/2007 | Davis |
| 7,324,525 | B2 | 1/2008 | Fuhs et al. |
| 7,355,977 | B1 | 4/2008 | Li |
| 7,376,772 | B2 | 5/2008 | Fallon |
| 7,403,542 | B1 | 7/2008 | Thompson |
| 7,420,931 | B2 | 9/2008 | Nanda et al. |
| 7,478,186 | B1 | 1/2009 | Onufryk et al. |
| 7,496,695 | B2 | 2/2009 | Go et al. |
| 7,500,028 | B2 | 3/2009 | Yamagishi |
| 7,512,721 | B1* | 3/2009 | Olson .............................. 710/22 |
| 7,533,197 | B2 | 5/2009 | Leonard et al. |
| 7,558,910 | B2 | 7/2009 | Alverson et al. |
| 7,571,299 | B2 | 8/2009 | Loeb |
| 7,647,416 | B2 | 1/2010 | Chiang et al. |
| 7,657,659 | B1 | 2/2010 | Lambeth et al. |
| 7,668,727 | B2 | 2/2010 | Mitchell et al. |
| 7,668,851 | B2 | 2/2010 | Triplett |
| 7,729,239 | B1 | 6/2010 | Aronov et al. |
| 7,734,809 | B2 | 6/2010 | Joshi et al. |
| 7,735,099 | B1 | 6/2010 | Micalizzi, Jr. |
| 7,742,412 | B1 | 6/2010 | Medina |
| 7,784,093 | B2 | 8/2010 | Deng et al. |
| 7,826,487 | B1 | 11/2010 | Mukerji et al. |
| 7,877,524 | B1 | 1/2011 | Annem et al. |
| 7,916,728 | B1 | 3/2011 | Mimms |
| 8,006,016 | B2 | 8/2011 | Muller et al. |
| 8,103,809 | B1 | 1/2012 | Michels et al. |
| 8,112,491 | B1 | 2/2012 | Michels et al. |
| 8,112,594 | B2 | 2/2012 | Giacomoni et al. |
| 8,279,865 | B2 | 10/2012 | Giacomoni et al. |
| 2002/0143955 | A1 | 10/2002 | Shimada et al. |
| 2003/0067930 | A1 | 4/2003 | Salapura et al. |
| 2003/0204636 | A1 | 10/2003 | Greenblat et al. |
| 2004/0202161 | A1* | 10/2004 | Stachura et al. .............. 370/389 |
| 2004/0249881 | A1 | 12/2004 | Jha et al. |
| 2004/0249948 | A1 | 12/2004 | Sethi et al. |
| 2004/0267897 | A1 | 12/2004 | Hill et al. |
| 2005/0007991 | A1 | 1/2005 | Ton et al. |
| 2005/0083952 | A1 | 4/2005 | Swain |
| 2005/0175014 | A1 | 8/2005 | Patrick |
| 2005/0213570 | A1 | 9/2005 | Stacy et al. |
| 2006/0007928 | A1 | 1/2006 | Sangillo |
| 2006/0067349 | A1 | 3/2006 | Ronciak et al. |
| 2006/0104303 | A1 | 5/2006 | Makineni et al. |
| 2006/0221832 | A1 | 10/2006 | Muller et al. |
| 2006/0221835 | A1 | 10/2006 | Sweeney |
| 2006/0235996 | A1 | 10/2006 | Wolde et al. |
| 2006/0288128 | A1* | 12/2006 | Moskalev et al. ............... 710/22 |
| 2008/0126509 | A1 | 5/2008 | Subramanian et al. |
| 2008/0184248 | A1 | 7/2008 | Barua et al. |
| 2009/0003204 | A1 | 1/2009 | Okholm et al. |
| 2009/0016217 | A1 | 1/2009 | Kashyap |
| 2009/0089619 | A1 | 4/2009 | Huang et al. |
| 2009/0222598 | A1* | 9/2009 | Hayden ........................... 710/28 |
| 2009/0248911 | A1* | 10/2009 | Conroy et al. .................. 710/25 |
| 2010/0082849 | A1* | 4/2010 | Millet et al. .................... 710/22 |
| 2010/0094945 | A1* | 4/2010 | Chan et al. .................... 709/206 |

OTHER PUBLICATIONS

"Plan 9 kernel history: overview / file list / diff list," <http://switch.com/cgi-bin/plan9history.cgi?f=2001/0126/pc/etherga620.com>, accessed Oct. 22, 2007, pp. 1-16.

Cavium Networks, "Cavium Networks—Products > Acceleration Boards > PCI, PCI-X," at http://www.cavium.com/acceleration_boards_PCI_PCI-X.htm (Downloaded Oct. 2008).

Cavium Networks, "Nitrox™ XL Security Acceleration Modules PCI 3V or 3V/5V—Universal Boards for SSL and IPSec," at http://www.Caviumnetworks.com, (2002) pp. 1, Cavium Networks, Mountain View, CA USA.

Cavium Networks, "Cavium Networks Product Selector Guide—Single & Multi-Core MIPS Processors, Security Processors and Accelerator Boards—Spring 2008," (2008) pp. 1-44, Cavium Networks, Mountain View, CA US.

Comtech AHA Corporation, "Comtech AHA Announces 3.0 Gbps GZIP Compression/Decompression Accelerator AHA362-PCIX offers high-speed GZIP compression and decompression," www.aha.com, (Apr. 20, 2005) pp. 1-2, Comtech AHA Corporation, Moscow, Idaho USA.

Comtech AHA Corporation, "Comtech AHA Announces GZIP Compression and Decompression IC Offers the highest speed and compression ratio performance in hardware on the market," www.aha.com, (Jun. 26, 2007) pp. 1-2, Comtech AHA Corporation, Moscow, Idaho USA.

Bell Laboratories, "Layer 4/7 Switching and Other Custom IP Traffic Processing Using the NEPPI API," Bell Laboratories, Lucent Technologies, Murray Hill, NJ 07974 USA, pp. 1-11 (2000).

http://lwn.net/images/pdf/LDD3/ch15.pdf, "Memory Mapping and DMA," Chapter 15, pp. 412-463 (Jan. 2005).

Eventhelix.com, "DMA and Interrupt Handling," at http://www.eventhelix.com/RealtimeMantra/FaultHandling/dma_interrupt_handling.htm (Downloaded Oct. 2009).

Eventhelix.com, "TCP—Transmission Control Protocol (TCP Fast Retransmit and Recovery)," (Mar. 2002).

Harvey, "DMA Fundamentals on Various PC Platforms," National Instruments, Application Note 011, pp. 1-18 (Apr. 1991).

Mangino, "Using DMA with High Performance Peripherals to Maximize System Performance," WW TMS470 Catalog Applications, at http://focus.ti.com/lit/wp/spna105/spna105.pdf (Jan. 2007).

Mogul, "The Case for Persistent-Connection HTTP," SIGCOMM, Cambridge, MA USA pp. 299-313 (Oct. 1995).

Rabinovich et al., "DHTTP: An Efficient and Cache-Friendly Transfer Protocol for the Web," IEEE/ACM Transactions on Networking 12(6):1007-20 (Dec. 2004).

Stevens, "TCP Slow Start, Congestion Avoidance, Fast Retransmit, and Fast Recovery Algorithms," Standards Track Memo pp. 1-6 (Jan. 1997).

Wadge, "Achieving Gigabit Performance on Programmable Ethernet Network Interface Cards," pp. 1-9 (May 2001).

Welch, "A User's Guide to TCP Windows," pp. 1-5 (Jun. 1996).

Wikipedia, "Direct Memory Access," at http://en.wikipedia.org/wiki/Direct_memory_access, pp. 1-6 (Downloaded Oct. 2009).

Wikipedia, "Nagle's Algorithm," at Nagle's Algorithm—Wikeopedia.xps (Last Modified Oct. 2009).

Salchow, Jr., KJ, "Clustered Multiprocessing: Changing the Rules of the Performance Game," F5 White Paper, Jan. 2008, pp. 1-11, F5 Networks, Inc.

\* cited by examiner

METHODS FOR SHARING BANDWIDTH ACROSS A PACKETIZED BUS AND SYSTEMS THEREOF

PRIORITY CLAIM

This application claims the benefit of U.S. Provisional Patent Application Ser. No. 61/145,475, filed on Jan. 16, 2009, entitled "Methods for Sharing Bandwidth Across a Packetized Bus and Systems Thereof", which is hereby incorporated by reference in its entirety.

TECHNOLOGICAL FIELD

This technology generally relates to sharing bandwidth across a packetized bus, and more particularly, to systems and methods for multiple direct memory access (DMA) channels fairly sharing bandwidth across a packetized bus.

BACKGROUND

Modern network interface controller (NIC) devices feature multiple DMA channels connected to a host CPU over a packetized bus, e.g., HyperTransport or PCI Express. The DMA channels in these devices must share access to the CPU bus amongst themselves. Sharing is typically done fairly on a per network packet basis.

However, such implementations allow the distribution of network packet sizes to affect the proportion of CPU bus bandwidth captured by each DMA channel. Assuming the CPU bus bandwidth is oversubscribed, a DMA channel passing mostly small packets will receive much less bandwidth than a DMA channel passing mostly large packets.

If the distribution of packet sizes across each DMA channel is statistically the same, then the bandwidth distribution will even out over time, and CPU bus bandwidth sharing will be fair. However, if the DMA channels are attached to disparate applications, with widely different network packet size characteristics, then applications transiting primarily large packets will capture more of the CPU bus bandwidth than they should, therefore resulting in computational inefficiencies and disparate CPU resource distribution.

SUMMARY

One example in the present disclosure is a traffic management device, e.g., an application delivery controller with multiple DMA channels provided to interface between a network and a host. The traffic management apparatus includes one or more processors executing one or more traffic management applications or application programs (e.g., network traffic application programs), a memory, a network interface controller coupled to the one or more processors and the memory and configured to receive data packets from a network that relate to the executing traffic management applications, and at least one of the one or more processors and the network interface controller including logic capable of being further configured to implement receiving at a network traffic management device a first network packet from a first DMA channel. The network interface controller is configured to implement segmenting the received first network packet from the first DMA channel into one or more first constituent CPU bus packets. The network interface controller is configured to implement receiving at the network traffic management device a second network packet from a second DMA channel, segmenting the received second network packet from the second DMA channel into one or more second constituent CPU bus packets. The one or more first constituent CPU bus packets and the one or more second constituent CPU bus packets are interleaved for transmission across a packetized CPU bus. The network interface controller can be implemented, for example, as a "High Speed Bridge" provided in the BIG-IP® device by F5 Networks, Inc. of Seattle, Wash., that can interface to the host computer via a packetized bus, e.g., a HyperTransport bus or a PCI Express bus, for example. The application delivery controller, including the network interface controller, for example, can interface to the network via an Ethernet port, e.g., a 10 Gigabit Ethernet port, for example.

According to another example, a method for sharing bandwidth among executing application programs includes receiving at a network traffic management device a first network packet from a first DMA channel by an application delivery controller and segmenting the received first network packet from the first DMA channel into one or more first constituent CPU bus packets. In this example, the method further includes receiving a second network packet from a second DMA channel by the network traffic management device and segmenting the received network packet from the second DMA channel into one or more second constituent CPU bus packets. The method also includes interleaving the one or more first constituent CPU bus packets and the one or more second constituent CPU bus packets, and reassembling the interleaved one or more first constituent CPU bus packets and the one or more second constituent CPU bus packets on a packetized CPU bus.

In another example, a computer readable medium has instructions stored on it for sharing bandwidth among executing application programs. When executed by at least one processor, the instructions on the computer readable medium cause the processor to perform steps including receiving a first network packet from a first DMA channel by a network traffic management device and segmenting the received first network packet from the first DMA channel into one or more first constituent CPU bus packets. The instructions on the computer readable medium further cause the processor to perform steps including receiving a second network packet from a second DMA channel by the network traffic management device and segmenting the received second network packet from the second DMA channel into one or more second constituent CPU bus packets. Further, the instructions on the computer readable medium also cause the processor to perform the steps of interleaving the one or more first constituent CPU bus packets and the one or more second constituent CPU bus packets and reassembling the interleaved one or more first constituent CPU bus packets and the one or more second constituent CPU bus packets on a packetized CPU bus.

In another example, a traffic management device, e.g., an application delivery controller with multiple DMA channels provided to interface between a network and a host. The traffic management apparatus includes one or more processors executing one or more traffic management applications or application programs (e.g., network traffic application programs), a memory, a network interface controller coupled to the one or more processors and the memory and configured to receive data packets from a network that relate to the executing traffic management applications, and at least one of the one or more processors and the network interface controller including logic capable of being further configured to implement receiving a first and a second read request packet from a first and a second DMA channel, respectively, in an application delivery controller. The network interface controller is configured to implement segmenting the received first and second read request packets into one or more first and second constituent CPU bus read request packets to be transmitted across a packetized CPU bus, respectively, accessing from a memory coupled to the packetized CPU bus one or more first constituent CPU bus read completion packets corresponding to the one or more first constituent CPU bus read request packets and one or more second constituent CPU bus read completion packets corresponding to the one or more second constituent CPU bus read request packets, interleaving the accessed one or more first and second constituent CPU bus read completion packets for transmission across the packetized CPU bus, and reassembling the interleaved one or more first and second constituent CPU bus read completion packets into respective first and second network packets for transmission across a network link in response to the first and second read request packets.

In another example, a method for sharing bandwidth among executing application programs includes receiving a first and a second read request packet from a first and a second DMA channel, respectively, in a traffic management device. The method includes segmenting the received first and second read request packets into one or more first and second constituent CPU bus read request packets to be transmitted across a packetized CPU bus, respectively, accessing from a memory coupled to the packetized CPU bus one or more first constituent CPU bus read completion packets corresponding to the one or more first constituent CPU bus read request packets and one or more second constituent CPU bus read completion packets corresponding to the one or more second constituent CPU bus read request packets, interleaving the accessed one or more first and second constituent CPU bus read completion packets for transmission across the packetized CPU bus, and reassembling the interleaved one or more first and second constituent CPU bus read completion packets into respective first and second network packets for transmission across a network link in response to the first and second read request packets.

In yet another example, a computer readable medium has instructions stored on it for sharing bandwidth among executing application programs. When executed by at least one processor, the instructions on the computer readable medium cause the processor to perform steps including receiving a first and a second read request packet from a first and a second DMA channel, respectively, in a traffic management device. The instructions on the computer readable medium further cause the processor to perform steps including segmenting the received first and second read request packets into one or more first and second constituent CPU bus read request packets to be transmitted across a packetized CPU bus, respectively, accessing from a memory coupled to the packetized CPU bus one or more first constituent CPU bus read completion packets corresponding to the one or more first constituent CPU bus read request packets and one or more second constituent CPU bus read completion packets corresponding to the one or more second constituent CPU bus read request packets, interleaving the accessed one or more first and second constituent CPU bus read completion packets for transmission across the packetized CPU bus, and reassembling the interleaved one or more first and second constituent CPU bus read completion packets into respective first and second network packets for transmission across a network link in response to the first and second read request packets.

The examples disclosed offer many advantages. For example, the packetized CPU bus can use network packets that are segmented and/or reassembled (SAR) into small constituent packets, e.g., HyperTransport packets or PCI Express packets. These smaller constituent packets can then cross the packetized CPU bus, or transmitted across the packetized CPU bus. Each DMA channel in the network interface controller can maintain an independent segmented and/or reassembled context and the packetized bus stream to and from each DMA channel can be substantially interleaved across the packetized CPU bus. By breaking the network packet into small constituent CPU bus packets, each DMA channel can receive its fair share of CPU bus bandwidth independent of network packet sizes. HyperTransport packets or PCI Express packets, or other types of CPU bus packets, from a single large network packet on one DMA channel can be interleaved on the CPU bus with HyperTransport packets or PCI Express packets from many small network packets from a different DMA channel, thereby efficiently utilizing bandwidth of a CPU bus. Further, although a single network traffic management device is described in the examples below, the examples may be extended to be applicable to a plurality of network traffic management device, as can be contemplated by one of ordinary skill in the art after reading this disclosure.

These and other advantages, aspects, and features will become more apparent from the following detailed description when viewed in conjunction with the accompanying drawings. Non-limiting and non-exhaustive examples are described with reference to the following drawings. Accordingly, the drawings and descriptions below are to be regarded as illustrative in nature, and not as restrictive.

DETAILED DESCRIPTION

Figure 1A:
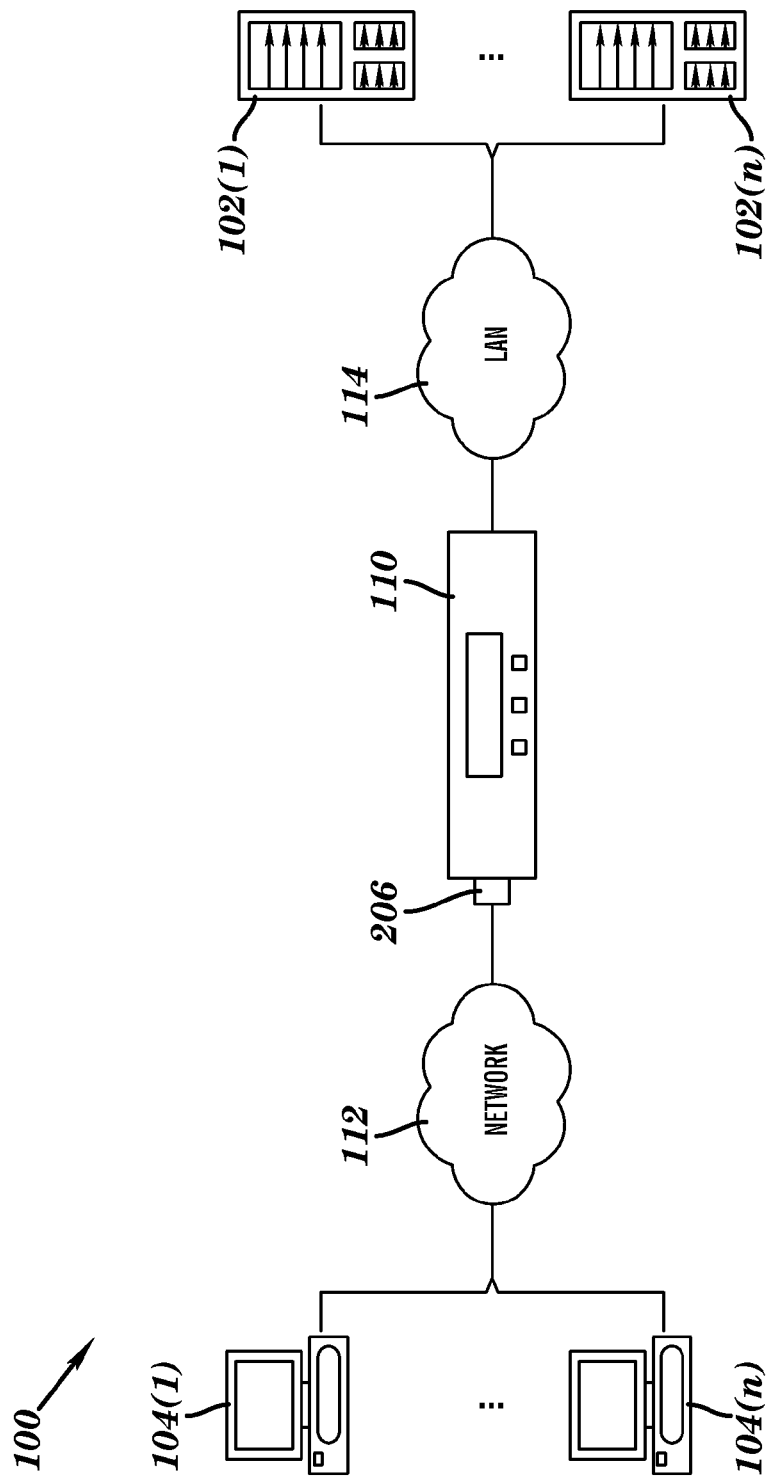
FIG. 1A is an exemplary network system using an application delivery controller that shares bandwidth across a packetized bus.

FIG. 1A is an exemplary network system 100 that that shares bandwidth across a packetized bus with connection state to servers 102(1) to 102(n) and can allow the servers 102 to process such packets without accessing buffer memory for the packet itself. A network 112 can provide responses and requests according to the HTTP-based application request for comments (RFC) protocol or the Common Internet File System (CIFS) or network file system (NFS) protocol in this example, but the principles discussed herein are not limited to these examples and can include other application protocols. The system 100 can include a series of one or more client devices, e.g., client computers 104(1) to 104(n), and application delivery controller 110 coupling the servers 102(1) to 102(n) to the client devices 104(1) to 104(n) through the network 112. For clarity and brevity, in FIG. 1A two server devices 102 are shown, but it should be understood that any number of server devices can use the exemplary network system 100. Likewise, two client devices 104 are shown in FIG. 1A, but any number of client devices can also use the exemplary network system 100 as well. The ellipses and the designation "n" denote an unlimited number of server devices and client devices, respectively. In the examples discussed, client devices are referred to by reference numeral 104 and server devices are referred to by reference numeral 102.

Servers 102(1)-102(n) comprise one or more server computing machines capable of operating one or more Web-based applications that may be accessed by network devices in the network 112, e.g., client devices 104(1)-104(n) (also referred to as client computers 104(1)-104(n)), via application delivery controller 110, and may provide other data representing requested resources, e.g., particular Web page(s), image(s) of physical objects, and any other objects, responsive to the requests, although the servers 102(1)-102(n) may perform other tasks and provide other types of resources. It should be noted that while only two servers 102(1) and 102(n) are shown in the network system 100 depicted in FIG. 1A, other numbers and types of servers may be coupled to the application delivery controller 110. It is also contemplated that one or more of the servers 102(1)-102(n) may be a cluster of servers managed by a network traffic management device or apparatus, e.g., application delivery controller 110.

The client computers 104(1)-104(n) in this example can run interface applications, e.g., Web browsers that can provide an interface to make requests for and send data to different Web server-based applications via the network 112. A series of applications can run on the servers 102(1)-102(n) that allow the transmission of data that is requested by the client computers 104(1)-104(n). The servers 102(1)-102(n) can provide data or receive data in response to requests directed toward the respective applications on the servers 102(1)-102(n) from the client computers 104(1)-104(n). As per the TCP, packets can be sent to the servers 102(1)-102(n) from the requesting client computers 104(1)-104(n) to send data. It is to be understood that the servers 102(1)-102(n) can be hardware or software or can represent a system with multiple servers, which can include internal or external networks. In this example the servers 102(1)-102(n) can be any version of Microsoft® IIS servers or Apache® servers, although other types of servers can be used. Further, additional servers can be coupled to the network 112 and many different types of applications can be available on servers coupled to the network 112.

Generally, the client devices, e.g., the client computers 104(1)-104(n) can include virtually any computing device capable of connecting to another computing device to send and receive information, including Web-based information. The set of such devices can include devices that typically connect using a wired (and/or wireless) communications medium, e.g., personal computers (e.g., desktops, laptops), mobile and/or smart phones and the like. In this example, the client devices can run Web browsers that can provide an interface to make requests to different Web server-based applications via the network 112. A series of Web-based applications can run on the application servers 102(1)-102(n) that allow the transmission of data that is requested by the client computers 104(1)-104(n). The client computers 104(1)-104(n) can be further configured to engage in a secure communication with the application delivery controller 110 and/or the servers 102(1)-102(n) using mechanisms, e.g., Secure Sockets Layer (SSL), Internet Protocol Security (IPSec), Tunnel Layer Security (TLS), and the like.

In this example, the network 112 comprises a publicly accessible network, e.g., the Internet, which includes client computers 104(1)-104(n), although the network 112 may comprise other types of private and public networks that include other devices. Communications, e.g., requests from client computers 104(1)-104(n) and responses from servers 102(1)-102(n), take place over the network 112 according to standard network protocols, e.g., the HTTP and TCP/IP protocols in this example, but the principles discussed herein are not limited to this example and can include other protocols. Further, the network 112 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 112 includes any communication medium and method by which data may travel between client devices 104(1)-104(n), servers 102(1)-102(n) and application delivery controller 110, and these examples are provided by way of example only.

Each of the servers 102(1)-102(n), application delivery controller 110, and client computers 104(1)-104(n) can include a central processing unit (CPU), controller or processor, a memory, and an interface system which are coupled together by a bus or other link, although other numbers and types of each of the components and other configurations and locations for the components can be used. Since these devices are well known to those skilled in the relevant art(s), they will not be described in further detail herein.

In addition, two or more computing systems or devices can be substituted for any one of the systems in the system 100. Accordingly, principles and advantages of distributed processing, e.g., redundancy, replication, and the like, also can be implemented, as appropriate, to increase the robustness and performance of the devices and systems of the system 100. The system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

LAN 114 comprises a private local area network that includes the application delivery controller 110 coupled to the one or more servers 102(1)-102(n), although the LAN 114 may comprise other types of private and public networks with other devices. Networks, including local area networks, besides being understood by those skilled in the relevant arts, have already been generally described above in connection with network 112, and thus will not be described further here.

As shown in the example environment of network system 100 depicted in FIG. 1A, the application delivery controller 110 can be interposed between the network 112 and the servers 102(1)-102(n) connected to LAN 114 as shown in FIG. 1A. Again, the network system 100 could be arranged in other manners with other numbers and types of devices. Also, the application delivery controller 110 is coupled to network 112 by one or more network communication links and intermediate network devices, e.g., routers, switches, gateways, hubs and other devices (not shown). It should be understood that the devices and the particular configuration shown in FIG. 1A are provided for exemplary purposes only and thus are not limiting.

Generally, the application delivery controller 110 manages network communications, which may include one or more client requests and server responses, from/to the network 112 between the client devices 104(1)-104(n) and one or more of the servers 102(1)-102(n) in LAN 114 in these examples. These requests may be destined for one or more servers 102(1)-102(n), and, as alluded to earlier, may take the form of one or more TCP/IP data packets originating from the network 108, passing through one or more intermediate network devices and/or intermediate networks, until ultimately reaching the application delivery controller 110, for example. In any case, the application delivery controller 110 may manage the network communications by performing several network traffic management related functions involving the communications, e.g., load balancing, access control, VPN hosting, network traffic acceleration, and applying quality of service levels to multiple direct memory access channels in accordance with the processes described further below in connection with FIGS. 1B-5B, for example.

Each of the client computers 104(1)-104(n), application delivery controller 110, and servers 102(1)-102(n) can include a central processing unit (CPU), controller or processor, a memory, and an interface system which are coupled together by a bus or other link, although other numbers and types of each of the components and other configurations and locations for the components can be used. The processors in the client computers 104(1)-104(n), the server 102(1)-102(n), and the application delivery controller 110 can execute a program of stored instructions for one or more aspects of the methods and systems as described herein, although the processor could execute other types of programmed instructions. The memory can store these programmed instructions for one or more aspects of the methods and systems as described herein, although some or all of the programmed instructions could be stored and/or executed elsewhere. A variety of different types of memory storage devices, e.g., a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory. The user input device can include a computer keyboard and a computer mouse, although other types and numbers of user input devices can be used. The display can include a computer display screen, e.g., a CRT or LCD screen by way of example only, although other types and numbers of displays could be used.

Although an example of the client computers 104(1)-104(n), application delivery controller 110, and servers 102(1)-102(n) are described and illustrated herein in connection with FIG. 1, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the devices of the system 100 can be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

Figure 1B:
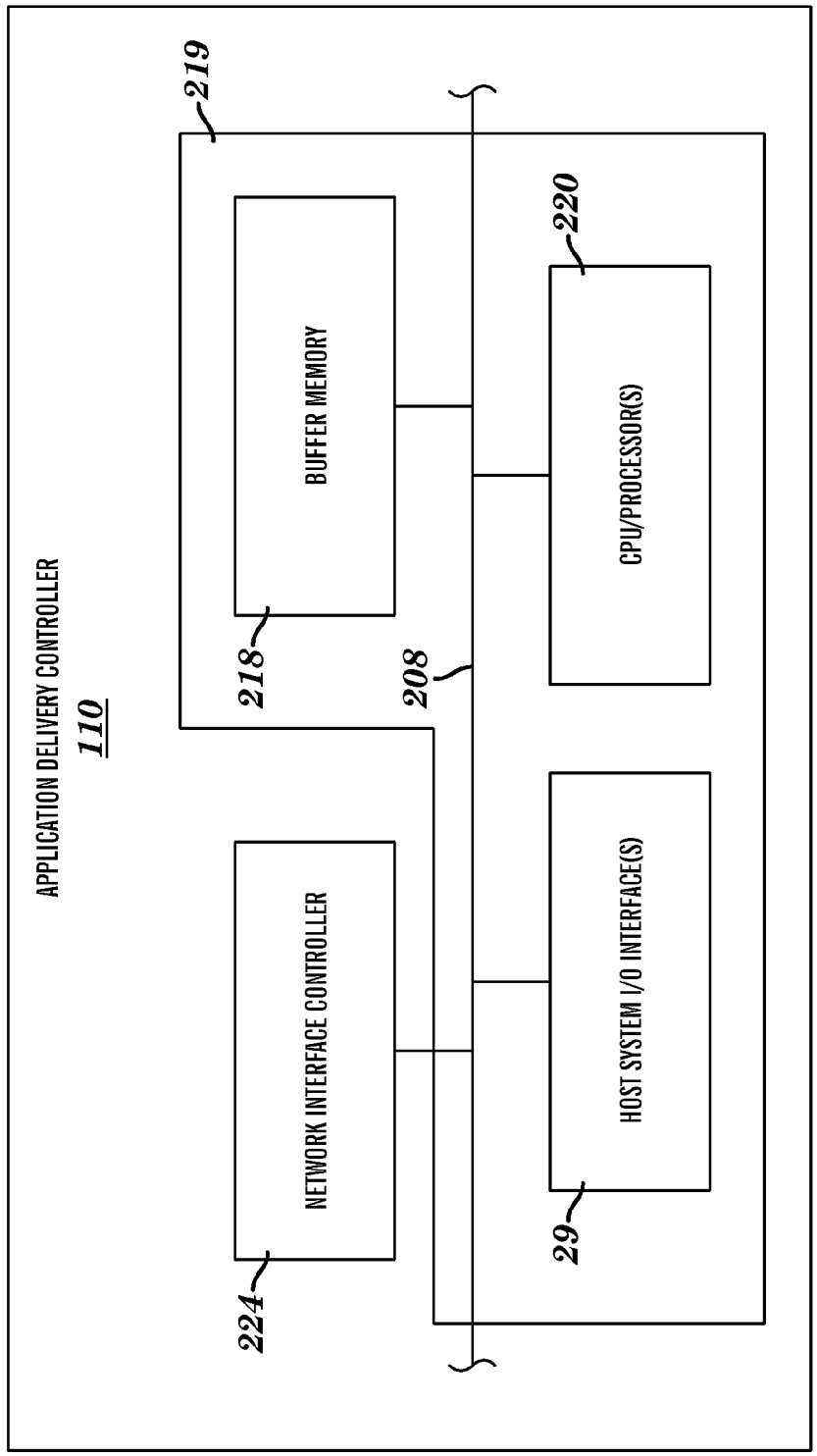
FIG. 1B is a block diagram of an application delivery controller in the exemplary network environment.

Referring now to FIG. 1B, an example application delivery controller 110 includes a host system processor complex 219 including a processor or CPU 220, a buffer memory 218, host system I/O interface(s) 29, and a network interface controller 224, which are coupled together by a packetized CPU bus 208 or other numbers and types of links, although the application delivery controller 110 can include other components and elements in other configurations. In this example, the application delivery controller 110 is implemented as a standalone device, although the controller 110 could be implemented as a blade device in a chassis-blade implementation.

CPU 220 comprises one or more microprocessors configured to execute computer/machine readable and executable instructions stored in buffer memory 218 to implement network traffic management related functions of the application delivery controller 110 in addition to performing one or more portions of the processes described further below in connection with FIGS. 2-5B, for example, although CPU 220 can comprise other types and/or combinations of processors, e.g., digital signal processors, micro-controllers, application specific integrated circuits ("ASICs"), programmable logic devices ("PLDs"), field programmable logic devices ("FPLDs"), field programmable gate arrays ("FPGAs"), and the like, programmed or configured according to the teachings as described and illustrated herein with respect to FIGS. 2-5B.

Buffer memory 218 includes computer readable media, namely computer readable or processor readable storage media, which are examples of machine-readable storage media. Computer readable storage/machine-readable storage media can include volatile, nonvolatile, removable, and non-removable media implemented in any method or technology for storage of information, e.g., computer readable/machine-executable instructions, data structures, program modules, or other data, which can be obtained and/or executed by one or more processors, e.g., CPU 220, to perform actions, including implementing an operating system for controlling the general operation of application delivery controller 110 to manage network traffic and applying quality of service levels to multiple direct memory access channels in accordance with the processes described further below in connection with FIGS. 2-5B, for example. Although buffer memory 218 is being described as a buffer, other forms of memory as described below may also be used.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the appropriate information, including data and/or computer/machine-executable instructions, and which can be accessed by a computing or specially programmed device, e.g., application delivery controller 110. When the instructions stored in buffer memory 218 are run by the CPU 220, the application delivery controller 110 implements at least a portion of the processes described further below for applying quality of service levels to multiple direct memory access channels in connection with FIGS. 2-5B, in addition to the various network traffic management related functions, including one or more of firewall functions, access control, server load balancing functions, device configuration functions (e.g., defining network security policies), VPN hosting, network traffic acceleration, and other functions.

Host system I/O interface(s) 29 comprises one or more user input and output device interface mechanisms, e.g., a computer keyboard, mouse, display device, and the corresponding physical ports and underlying supporting hardware and software to enable the application delivery controller 110 to communicate with the outside environment for accepting user data input and to provide user output, although other types and numbers of user input and output devices can be used. Alternatively or in addition, as will be described in connection with network interface controller 224 below, the application delivery controller 110 can communicate with the outside environment for certain types of operations (e.g., configuration) via a network management port, for example.

Network interface controller 224 comprises one or more mechanisms that enable application delivery controller 110 to engage in TCP/IP communications over LAN 114 and network 112 and to apply different quality of service levels to multiple direct memory access channels, although the network interface controller 224 can be constructed for use with other communication protocols and types of networks, and can include other components, and can perform other functions. Network interface controller 224 is sometimes referred to as a transceiver, transceiving device, or network interface card (NIC), which transmits and receives network data packets to one or more networks, e.g., LAN 114 and network 112 in this example; and where the application delivery controller 110 includes more than one CPU 220 (or a CPU 220 that has more than one processing core), each CPU 220 (and/or core) can use the same single network interface controller 224 or a plurality of network interface controllers 224. Further, the network interface controller 224 can include one or more physical ports to couple the application delivery controller 110 with other network devices, e.g., servers 102(1)-102(n). Moreover, the network interface controller 224 can include certain physical ports dedicated to receiving and/or transmitting certain types of network data, e.g., device management related data for configuring the application delivery controller 110.

In this example, the network interface controller 224 is an FPGA that can include a local memory and be configured with logic to implement one or more aspects of the technology, including by way of example only, applying quality of service levels to multiple direct memory access channels, although the network interface controller 224 can comprise other types of configurable hardware, e.g., digital signal processors, micro-controllers, ASICs, PLDs, FPLDs, and the like, programmed or configured according to the teachings as described and illustrated herein with respect to FIGS. 2-5B, as well as software executed by the CPU 220, combinations thereof, and other components and elements configured in other manners which could implement one or more aspects of the technology. The use of specialized hardware in this example allows the network interface controller 224 to rapidly process network data packets.

CPU Bus 208 comprises one or more internal device component communication buses, links, bridges and supporting components, e.g., bus controllers and/or arbiters, which enable the various components of the application delivery controller 110, e.g., the CPU 220, buffer memory 218, host system I/O interface 29, and network interface controller 224, to communicate, although the CPU bus 208 can enable one or more components of the application delivery controller 110 to communicate with components in other devices as well. By way of example only, example buses include HyperTransport, PCI, PCI Express, InfiniBand, USB, Firewire, Serial ATA (SATA), SCSI, IDE and AGP buses, although other types and numbers of buses can be used and the particular types and arrangement of buses will depend on the particular configuration of the application delivery controller 110.

As described in detail below, the application delivery controller 110 can receive network packets that can include data requested for the server applications running on servers 102(1)-102(n). The requested network packets can be routed from the client computers 104(1)-104(n) to one or more of the servers 102(1)-102(n) via network 112, although the network packets may also traverse other paths in the exemplary network system 100, for example, between two of servers 102(1)-102(n).

Figure 2:
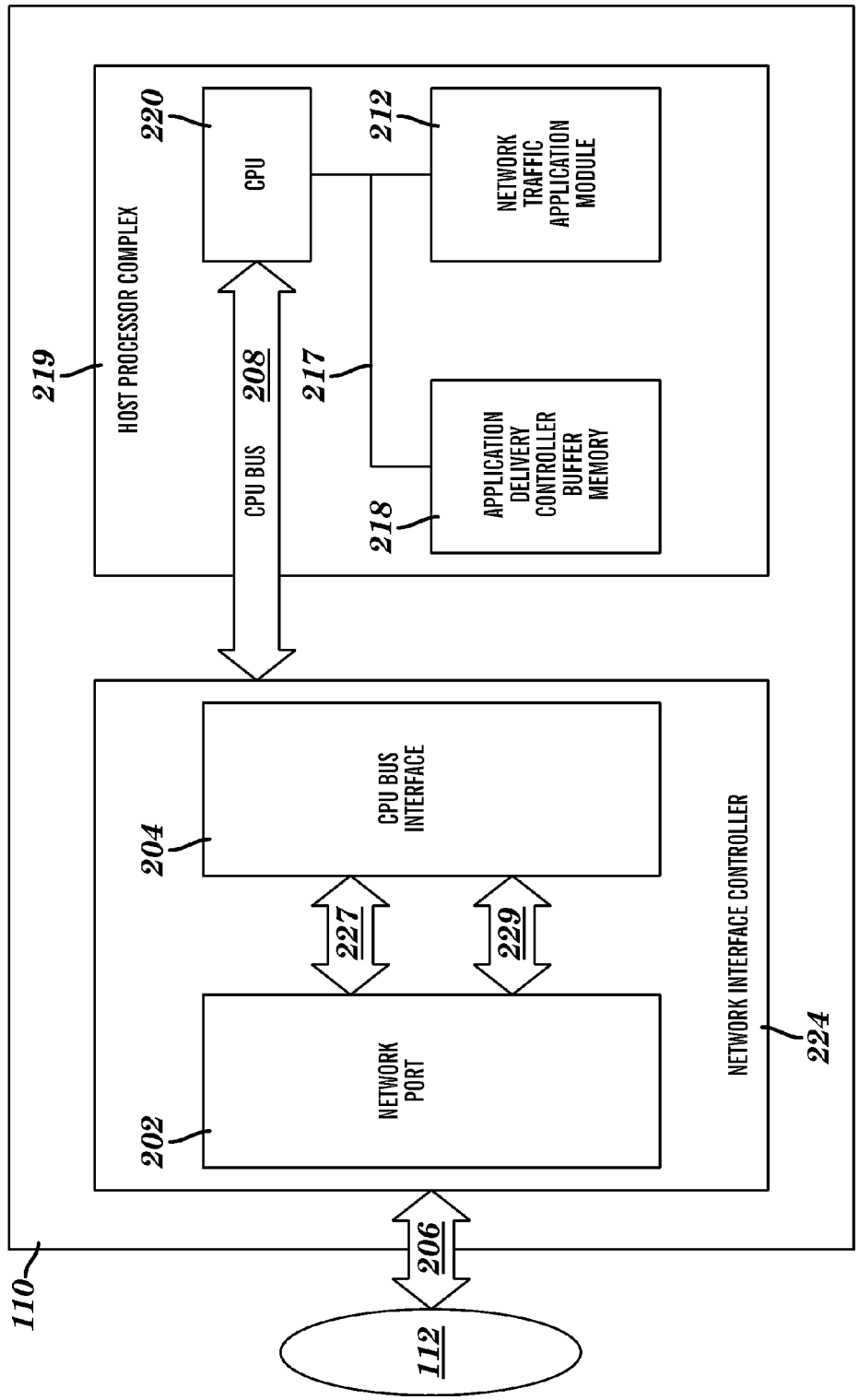
FIG. 2 is another block diagram of an application delivery controller that shares bandwidth across a packetized bus in the network system of FIG. 1A for a network packet received from a network by the application delivery controller.

FIG. 2 is a block diagram of an application delivery controller 110 that can share bandwidth across a packetized CPU bus, e.g., a HyperTransport bus, a PCI Express bus, and the like. In this example, the application delivery controller 110 can include a performance blade having network interface controller 224 that can be implemented in specialized hardware for maximum execution speeds. In this example, the control logic of network interface controller 224 is embodied and can be implemented in a field programmable gate array (FPGA). Of course, other hardware (e.g., one or more ASICs) and/or software executing in conjunction with the hardware can be used for the network interface controller 224. The network interface controller 224 in this example can include a network port 202 and a CPU bus interface 204 that can be, for example, a HyperTransport bus interface. The network port 202 can be an Ethernet port coupled to an Ethernet link 206 that in this example can be a 10 Gigabit Ethernet connection that receives network packets from the network 112. The Ethernet link 206 can provide communication with the network 112 via a router, a network hub, a switch (none shown) or other intermediate devices that provide connectivity inside enterprises, between enterprises and the Internet, and inside Internet Service Providers (ISPs). The CPU bus interface 204 in this example can be coupled to the packetized CPU bus 208, e.g., a HyperTransport bus, a PCI Express bus, and the like, that can be coupled to the internal components of the application delivery controller 110, including CPU 220 and a network traffic application module 212 as shown in FIG. 2.

The network interface controller 224 is a device used to bridge data traffic between host processor complex 219 within application delivery controller 110 and one or more high speed input/output (I/O) devices, e.g., client computers 104(1)-104(n). The host processor complex 219 includes processor or CPU 220, buffer memory 218, and network traffic application module 212 interconnected by an internal bus 217, although the host processor complex 219 can also include additional components, for example, additional processors, controllers and electronic circuitry to handle data. The network interface controller 224 connects to the host processor complex 219 over packetized CPU bus 208. The network interface controller 224 provides DMA services to the network traffic application module 212 in host processor complex 219 on behalf of I/O devices attached to the network interface controller 224. DMA services are provided through one or more DMA channels 227, 229. Each DMA channel supports the movement of data traffic between the I/O devices and the host processor complex 219's buffer memory 218. A single DMA channel, e.g., DMA channels 227 or 229, can access any of the attached I/O devices through the network interface controller 224's internal switching matrix.

In this example, the application delivery controller 110 can include processor or CPU 220 assisting functioning of the network traffic application module 212. The network traffic application module 212 can be a standalone module with associated hardware components and logic, or alternatively, may be a part of buffer memory 218. The network traffic application module 212 in conjunction with CPU 220 can support execution of a plurality of network application programs for handling the network packets and the CPU bus packets, for example, network packet 302 and CPU bus packets 11a and 11b The application delivery controller 110 can also include a memory device, e.g., buffer memory 218 that stores the received network packets from the network interface controller 224 and directional pointers that indicate the location in the buffer memory 218 of the stored packet. The processor or CPU 220 can access the buffer memory 218 via interrupts for direct memory accesses to data stored in different locations of the buffer memory 218 via the packetized CPU bus 208 and the CPU bus interface 204. The network interface controller 224 in this example can have multiple DMA channels, e.g., DMA channels 227 and 229, for example. Using DMA channels 227, 229, network packets received from the network 112 are written into buffer memory 218 by the network interface controller 224 through packetized CPU bus 208 after being split into constituent CPU bus packets. For transmitting network packets to network 112, using DMA channels 227, 229, CPU bus packets are read from buffer memory 218 and reassembled over the CPU bus 208 into network packets, as described in more exemplary details in FIG. 5B.

The DMA channels 227 and 229 access the buffer memory 218 of the application delivery controller 110. The network interface controller 224 in this example interfaces CPU 220 and buffer memory 218 via the packetized CPU bus 208 and to the network 112 via a 10 Gigabit Ethernet link 206. The network interface controller 224 provides multiple DMA channels 227, 229 that couple the network port 202 at which network packets are received by the application deliver controller to the CPU bus interface 204. Network packets are segmented into smaller CPU bus packets and sent over the packetized CPU bus 208 in an interleaved manner for processing by the host processor complex 219.

The packetized CPU bus 208 used by the network interface controller 224 in this example can segment and/or reassemble the network packets obtained from one or more of the DMA channels, e.g., DMA channels 227 and 229. The obtained network packets from the DMA channels 227 and 229 can be segmented and/or reassembled into smaller associated or constituent CPU bus packets, e.g., HyperTransport packets, to be transmitted over the packetized CPU bus 208. In one example, the maximum CPU bus packet size is 64 bytes, but of course other sizes can be used for the CPU bus packet size. The network packets may be segmented into multiple CPU bus packets and sent across the packetized CPU bus 208. For example, a simple network packet of 128 bytes may be segmented into two HyperTransport packets, with each HyperTransport packet being 64 bytes. Of course, other segmenting schemes can be used depending upon the size of the network packet and the size of the individual HyperTransport packets. The number of HyperTransport packets needed to send the entire network packet is a function of the size of the network packet and the size of the HyperTransport packets. It is to be noted that the CPU bus packets (e.g., CPU bus packets 11a and 11b shown in FIGS. 3A and 3B) can be of the same size, or may be of different sizes from each other (larger or smaller), depending upon the CPU bus packet size and the respective network packet size.

Similarly, in the reverse direction for transmitting network packets from application delivery controller 110 to client computers 104(1)-104(n) or to servers 102(1)-102(n) via network 112 or LAN 114, respectively, CPU bus packets are reassembled into network packets using DMA channels 227 and 229 and transmitted via network port 202 over the Ethernet link 206.

Each DMA channel, e.g., the DMA channels 227 and 229 in the network interface controller 224 maintains an independent segmentation and reassembly context. The CPU bus packet stream to and from each DMA channel 227 and 229 is fairly interleaved into at least one stream over the packetized CPU bus 208 based upon various schemes, e.g., round robin, by way of example only.

Figure 3A:
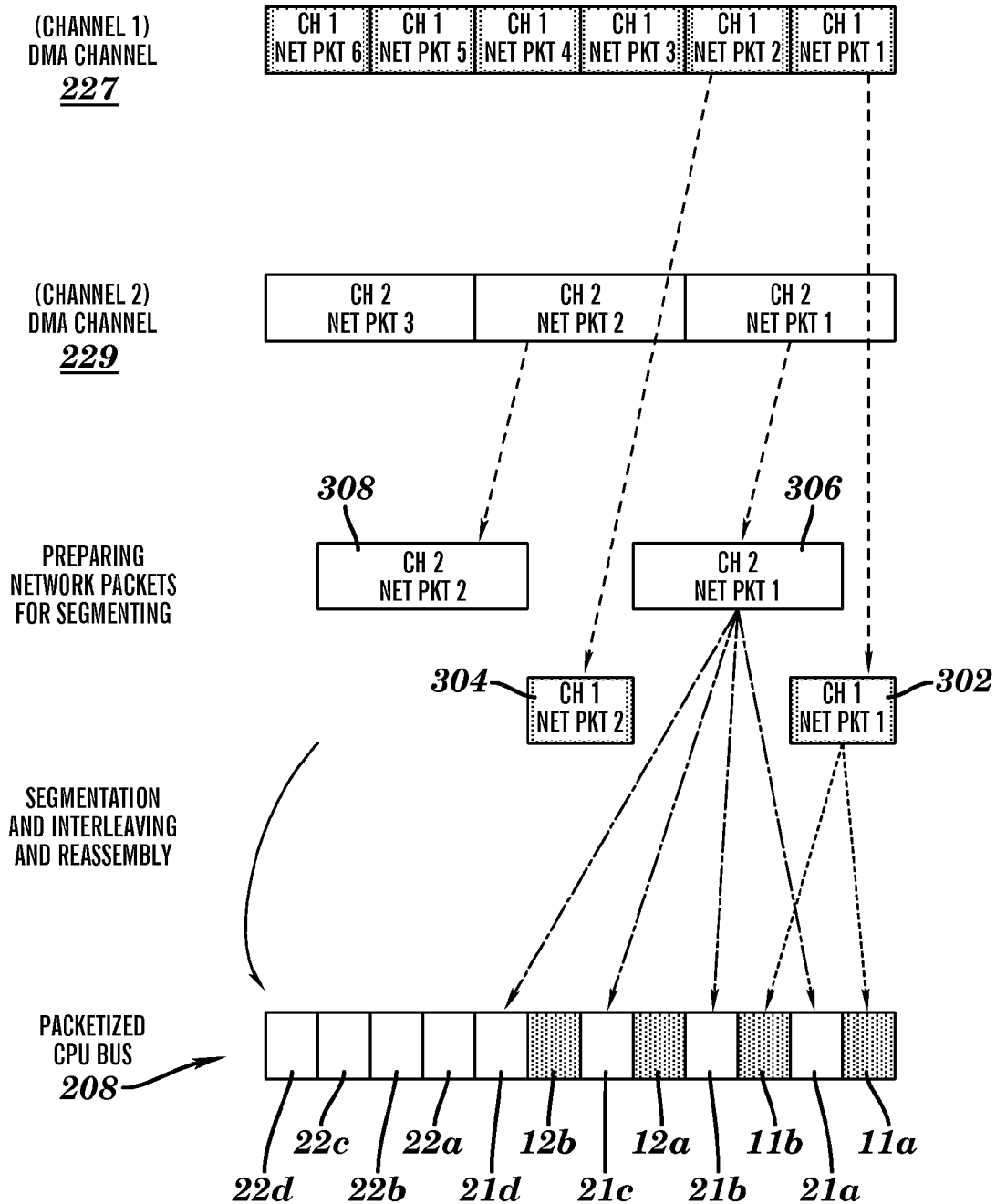
FIG. 3A is a diagram of the segmentation of network packets from multiple DMA channels to the packetized bus in the example network interface controller shown in FIG. 2.

FIG. 3A is a block diagram showing an example segmentation and reassembly of network packets from the DMA channels 227 and 229 to the packetized CPU bus 208. FIG. 3A includes network packets 302 and 304 from the DMA channel 227 in FIG. 2 and network packets 306 and 308 from the DMA channel 229. In this example, the network packets 302 and 304 of the DMA channel 227 are relatively smaller than the network packets 306 and 308 from the DMA channel 229. Of course, the network packets 302, 304, 306 and 308 from the DMA channels 227, 229 may be the same size or different sizes (larger or smaller than each other). In any event, the network packets 302, 304, 306 and 308 can be segmented to the smaller CPU bus packets for transmission across the packetized CPU bus 208. The smaller CPU bus packets are then interleaved and placed on the packetized CPU bus 208 for transmission over to host processor complex 219.

In this example, the network packet 302 from the DMA channel 227 is segmented into associated CPU bus packets 11a and 11b. By way of example only, CPU bus 208 can be a HyperTransport bus. Of course, if a different packetized CPU bus 208 were used, e.g., a PCI Express bus or the like, the segmented packets can be named and segmented differently. Referring again to the above example in FIG. 3A, the network packet 304 from the DMA channel 227 is similarly segmented into associated CPU bus packets 12a and 12b. The relatively larger network packet 306 from the DMA channel 229 is segmented into associated CPU bus packets 21a, 21b, 21c, and 21d. The relatively larger network packet 308 from the DMA channel 229 is segmented into associated CPU bus packets 22a, 22b, 22c and 22d. As shown in FIG. 3A, the associated CPU bus packet 11a containing part of the network packet 302 is sent on the packetized CPU bus 208 followed by the associated network packet 21a from the network packet 306 of the DMA channel 229. The CPU bus packets 11b and 21b are interleaved in turn resulting in an equalized packetized CPU bus 208 bandwidth to the network packets 302, 304, 306 and 308 originating from the DMA channels 227 and 229.

As shown in FIG. 3A, this scheme insures that each DMA channel 227, 229 receives its fair share of CPU bus 208 bandwidth independent of network packet sizes when the network packets originate from the DMA channels 227, 229. As shown in FIG. 3A, the CPU bus packets from a single large network packet, e.g., the network packet 306 on one DMA channel 229 will be interleaved on the packetized CPU bus 208 with the CPU bus packets from many small network packets from a different DMA channel, e.g., the network packets 302 and 304 from the DMA channel 227.

Figure 3B:
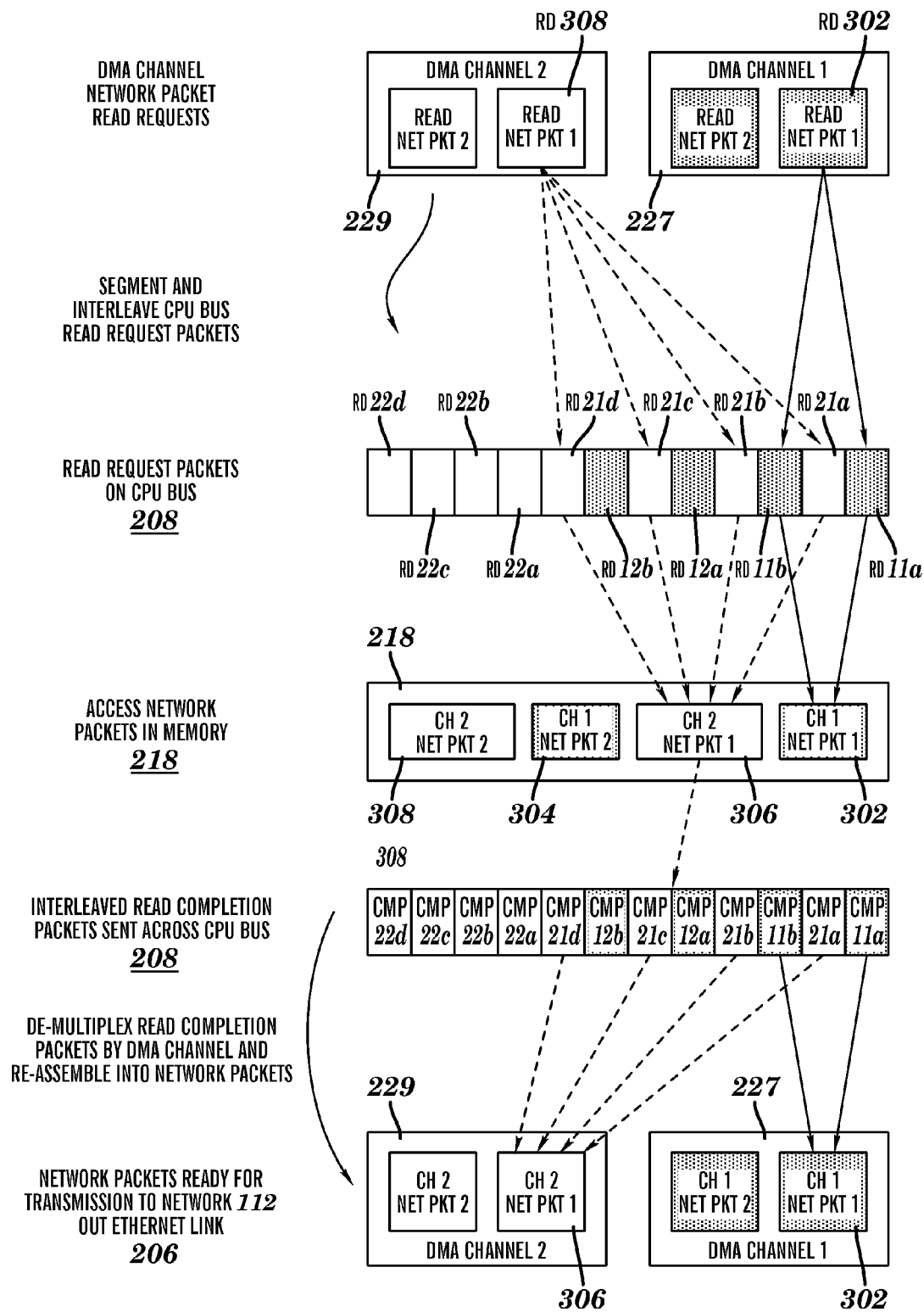
FIG. 3B is a diagram of the reassembly of CPU bus packets from the packetized CPU bus to the multiple DMA channels into respective network packets in the example network interface controller shown in FIG. 2B.

FIG. 3B illustrates the reverse process of reassembling network packets 302, 304, 306 and 308 from respective constituent CPU bus packets over corresponding DMA channels 227, 229. In this example, transmission of network packets 302 and 306 to network 112 is a split transaction. By way of example only, the network packets 302 and 306 can be requested to be read by a user at client computing devices 104(1)-104(n). As shown in FIG. 3B, DMA channels 227 and/or 229 receive read request packets RD 302 and RD 306. As explained in more detail in FIG. 4B, read request packets RD 302 and RD 306 are segmented and interleaved on packetized CPU bus 208 as CPU bus read request packets RD 11a, RD 11b and RD 21a-RD 21d. Following packetization of CPU bus read request packets RD 11a, RD 11b and RD 21a-RD 21d, and based upon information contained in CPU bus read request packets RD 11a, RD 11b and RD 21a-RD 21d, a memory controller (which can be a part of CPU 220 or alternatively, may be an independent controller) in host processor complex 219 accesses network packets 302 and 306 in buffer memory 218. Network packets 302 and 306 are split into smaller constituent CPU bus read completion packets CMP 11a, CMP 11b and CMP 21a-CMP 21d, respectively, which are sent across packetized CPU bus 208 to a demultiplexer (shown in FIG. 4B). CPU bus read completion packets CMP 11a, CMP 11b and CMP 21a-CMP 21d are then demultiplexed based upon DMA channels 227 and 229 and reassembled as network packets 302 and 306 ready for transmission to network 112 out through Ethernet link 206, for example. It is to be noted that the exemplary processes illustrated in FIGS. 3A and 3B can be carried out in parallel or in series, or based upon a round robin scheme as and when the network packets 302, 304, 306, and 308 arrive or when CPU bus read completion packets CMP 11a, CMP 11b, CMP 21a-21d, and CMP 22a-22d need to be reassembled and transmitted. Further by way of example only, CPU bus read completion packets CMP 11a, CMP 11b, CMP 21a-21d, and CMP 22a-22d can be HyperTransport packets or PCI Express packets, or other types of CPU bus packets.

Figure 4A:
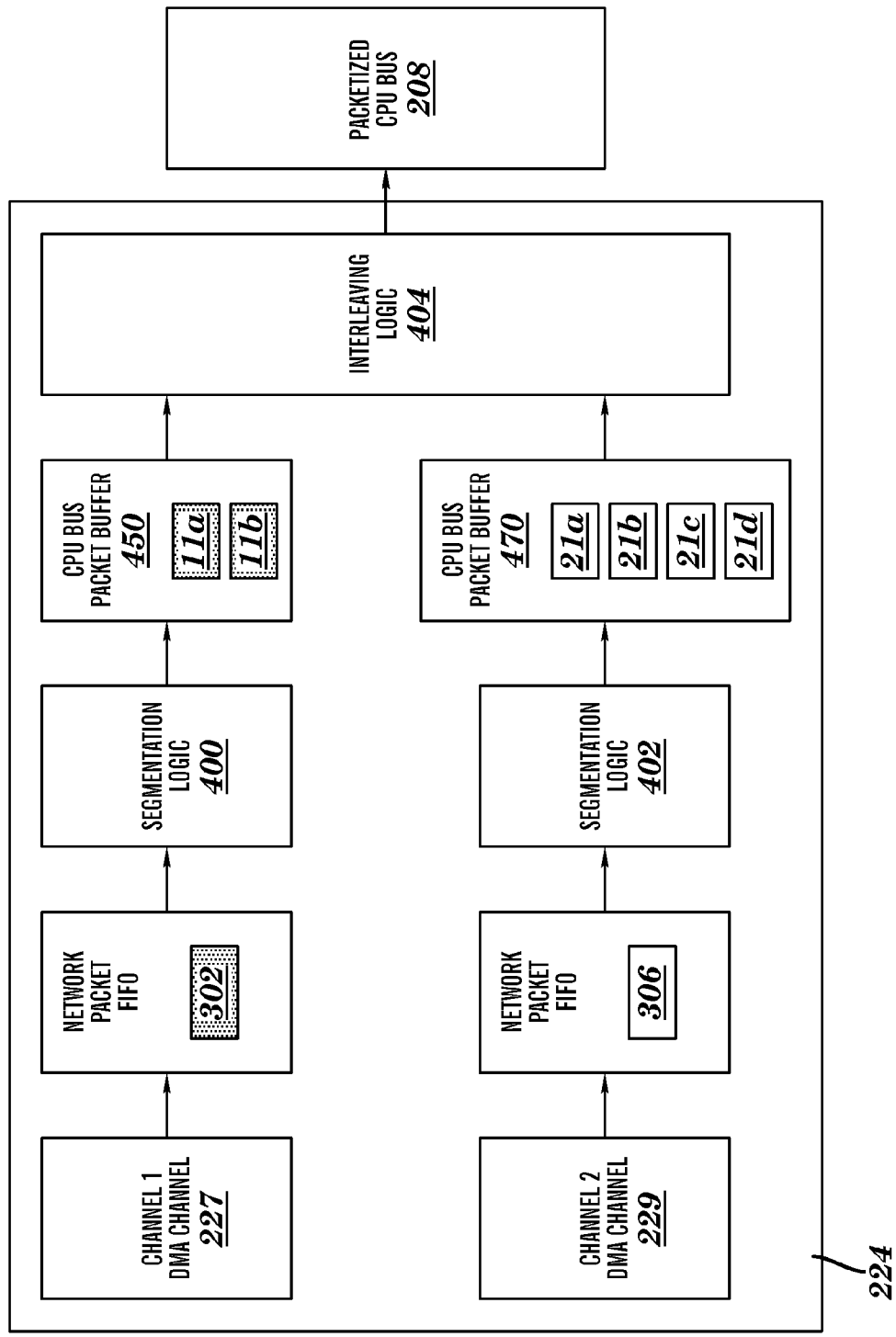
FIG. 4A is a diagram of the flow of received network packets from the multiple DMA channels to the packetized CPU bus.

FIG. 4A shows a block diagram of the flow of network packets 302 and 306 from the DMA channels 227 and 229 to CPU bus packets 11a, 11b, 21a, 21b, 21c, and 21d as shown in FIG. 3A. FIG. 4A shows the first DMA channel 227 that has a first network packet, e.g., the network packet 302 and the second DMA channel 229 that has a second network packet, e.g., the network packet 306. In this example, both of the DMA channels 227 and 229 process network packets, e.g., network packets 302 and 306, in a first in first out (FIFO) scheme, although other schemes, e.g., last in first out (LIFO) may also be used. The DMA channels 227 and 229 are coupled to network interface controller segmentation logic 400 and 402 both of which are a component of the network interface controller 224. The network interface controller segmentation logic 400 and 402 segments the network packets, e.g., the network packets 302 and 306 into smaller packets based on the CPU bus packet size as shown by FIG. 3A. The resulting CPU bus packets are arranged in buffers 450, 470, for example, in first in first out schemes and combined by an interleaving logic 404. The interleaving logic 404, takes each of the smaller CPU bus packets 11a, 11b, and 21a-21d between the DMA channels 227 and 229 in round robin fashion and sends the smaller packets to the packetized CPU bus 208, although other methods of sending, for example, a weighted round robin scheme, may also be used. In this example, as shown in FIG. 3A, the interleaving logic 404 first accesses the buffer 450 associated with the DMA channel 227 and places the CPU bus packet 11a which is part of the network packet 302 on the packetized CPU bus 208. The interleaving logic 404 then accesses the buffer 470 associated with the DMA channel 229 and places the CPU bus packet 21a which is part of the network packet 306 on the packetized CPU bus 208. The interleaving logic 404 then returns to the buffer 450 associated with the DMA channel 227 and places the next CPU bus packet, CPU bus packet 11b which is part of the network packet 302, on the packetized CPU bus 208. The interleaving logic 404 proceeds in round robin fashion until the buffers 450, 470 are empty.

Figure 4B:
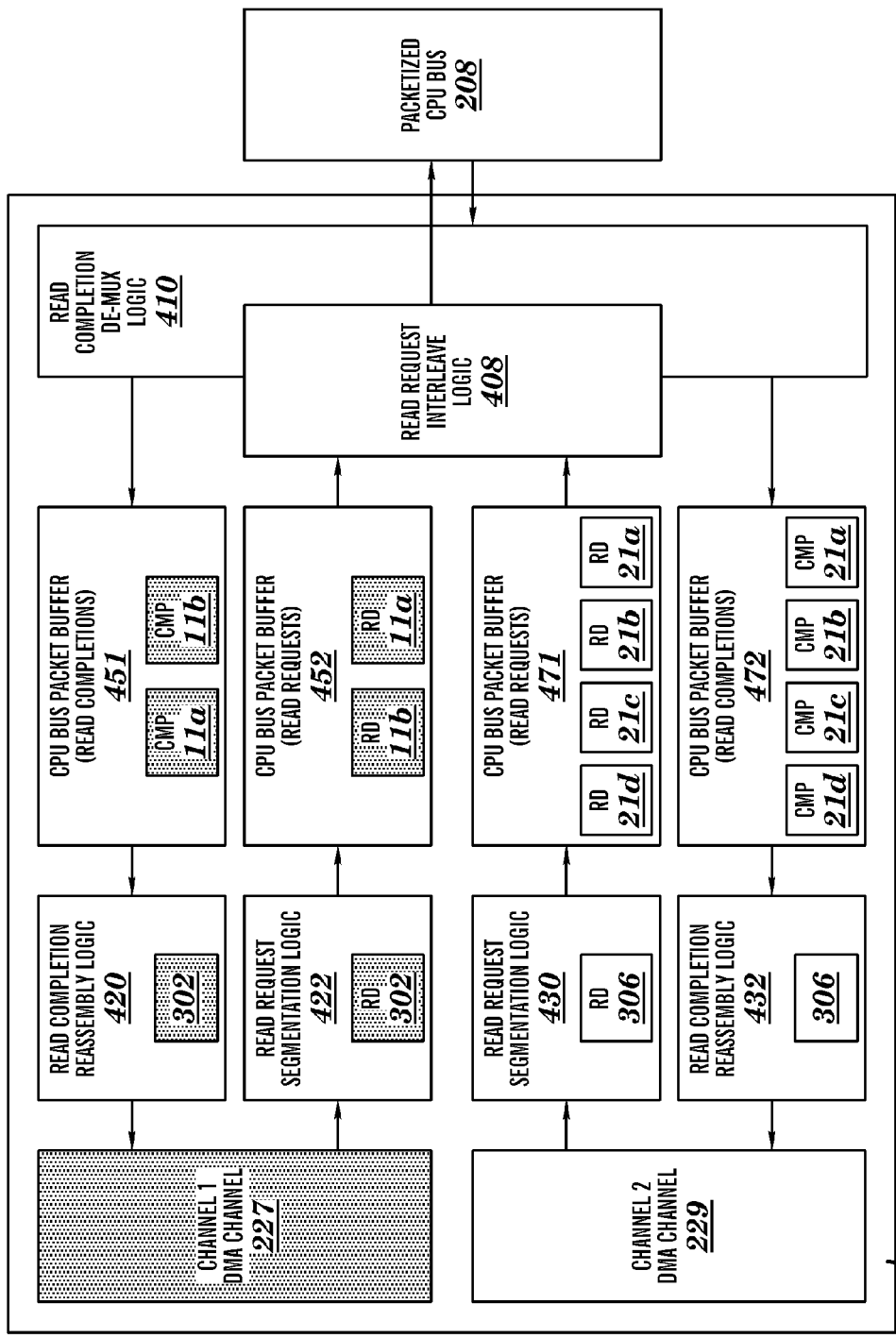
FIG. 4B is a diagram of the flow of CPU bus packets from the packetized CPU bus to the multiple DMA channels to be transmitted as network packets.

Referring now to FIG. 4B, a block diagram of flow of network packets 302 and 306 for transmission from DMA channels 227, 229 to network 112 (or alternatively, to LAN 114) is illustrated. DMA channels 227 and 229 are respectively coupled to Read Request Segmentation logic 422 and 430. Read Request Segmentation logic 422 receives a read request packet RD 302 for reading a network packet 302 associated with DMA channel 227 from buffer memory 218. Similarly, Read Request segmentation logic 430 receives a read request packet RD 306 for reading a network packet 306 associated with DMA channel 229 from buffer memory 218. Read request packets RD 302 and RD 306 contain information, e.g., memory address where constituent CPU bus packets associated with network packets 302 and 306 are stored in buffer memory 218. Both Read Request Segmentation logic 422 and 432 segment the read request packets RD 302 and RD 306 into smaller CPU Bus read request packets RD 11a, RD 11b and RD 21a-RD 21d based on the CPU bus packet size as shown in FIG. 3B CPU bus read request packets RD 11a, RD 11b and RD 21a-RD 21d are queued in Read Request CPU bus packet buffers 452 and 471, respectively, to be processed in a first in first out (FIFO) manner, although other methods of queuing order, for example, last in first out (LIFO) may also be used. CPU bus read request packets RD 11a, RD 11b and RD 21a-RD 21d are combined to be sent over packetized CPU bus 208 by Read request interleave logic 408. Based upon the information in CPU bus read request packets RD 11a, RD 11b and RD 21a-RD 21d, CPU bus packets 11a, 11b and 21a-21d are retrieved from buffer memory 218 to be transmitted as CPU bus read completion packets CMP 11a, CMP 11b and CMP 21a-CMP 21 interleaved over the packetized CPU bus 208, and transferred to Read completion de-multiplexing (DMUX) logic 410.

Read completion DMUX logic 410 distributes the received CPU bus read completion packets CMP 11a, CMP 11b and CMP 21a-CMP 21 from the packetized CPU bus 208 to CPU bus read completion packet buffers 451 and 472 where CPU bus read completion packets CMP 11a, CMP 11b and CMP 21a-CMP 21 are stored before being transferred to Read Completion reassembly logic 420 and 432, respectively, in a FIFO manner, although other schemes, e.g., a LIFO scheme may also be used to read out CPU bus read completion packets CMP 11a, CMP 11b and CMP 21a-CMP 21. Read completion reassembly logic 420 and 432 is coupled to respective DMA channels 227 and 229. CPU bus read completion packets CMP 11a, CMP 11b and CMP 21a-CMP 21 are reassembled into network packets 302 and 306 at Read completion reassembly logic 420 and 432, respectively, for transmission as network packets 302 and 306 to network 112 and/or LAN 114 using DMA channels 227 and 229, respectively. It is to be noted that although network packets 302 and 306 are being described in FIG. 4B, the example shown in FIG. 4B is applicable to higher or lower number of network packets, e.g., only one network packet or three or more network packets too.

The interleaving scheme implemented by interleaving logic 404 and 408 does not use fixed time slots across DMA channels 227, 229. If a CPU bus packet slot is unused by an idle DMA channel, the slot is available to the next active DMA channel. The CPU bus scheduling function shown in FIGS. 3A-4B fairly shares the bandwidth of the packetized CPU bus 208 across all active DMA channels. Of course, this interleaving scheme can be applied to any packetized CPU bus, for example, a HyperTransport bus, a PCI Express bus, and the like. Additionally, any number of DMA channels can be used with corresponding additional segmentation and reassembly steps.

Figure 5A:
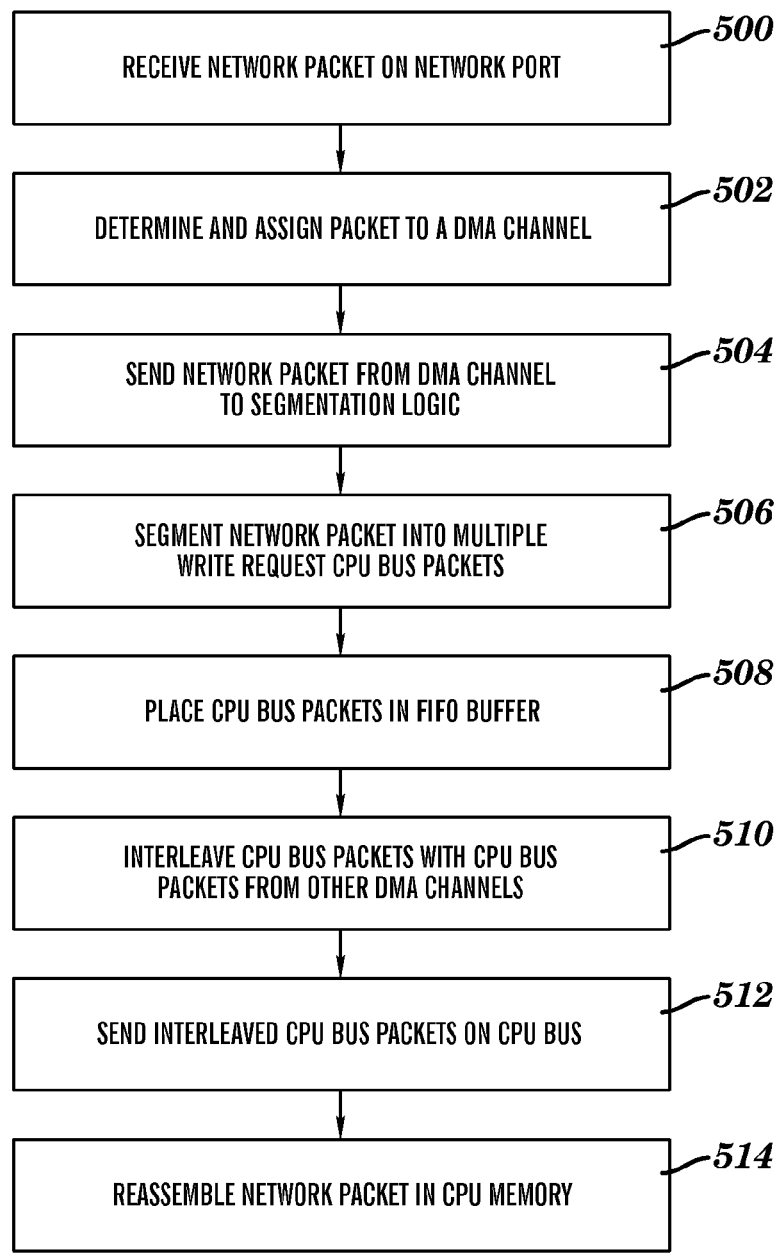
FIG. 5A is a flow diagram of an example process of segmenting and reassembling received network packets from multiple DMA channels to share equal bandwidth on a packetized bus.
Figure 5B:
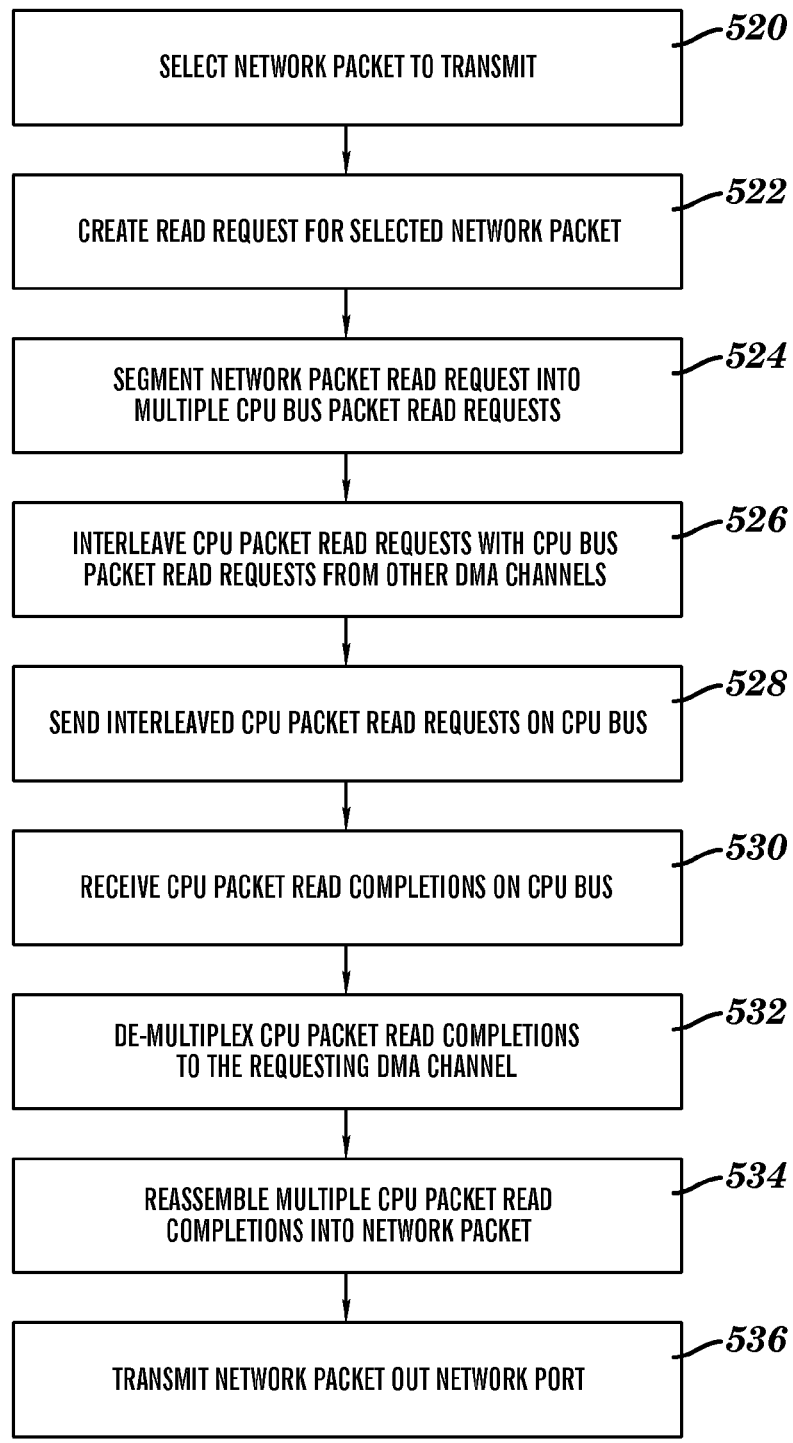
FIG. 5B is a flow diagram of an example process of reassembling network packets to be transmitted from multiple DMA channels to a network.

The operation of an example process to share CPU bus bandwidth among multiple channels shown in FIGS. 2-4B in conjunction with the flow diagrams shown in FIGS. 5A and 5B. The flow diagrams in FIGS. 5A and 5B are representative of example machine readable instructions for implementing the application delivery controller 110 and/or the input process to equalize CPU bus bandwidth among multiple DMA channels. The steps described below are example machine readable instructions (e.g., computer readable instructions stored on a computer readable medium) for implementing one or more methods in accordance with the examples described in the present disclosure. In one example, the machine readable instructions include an algorithm for execution by: (a) a processor, (b) a controller, and/or (c) one or more other suitable processing device(s). The algorithm can be instantiated in software stored on tangible media, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or in dedicated hardware in a known manner. For example, the algorithm can be implemented by an application specific integrated circuit (ASIC), a programmable logic device (PLD), a field programmable logic device (FPLD), a field programmable gate array (FPGA), discrete logic, etc.). For example, any or all of the components of the direct DMA process for sharing bandwidth through a common network interface could be implemented by software executing on hardware configured to sharing bandwidth, hardware only, and/or firmware. Also, some or all of the machine readable instructions described herein can be implemented manually. Further, although various examples are described and illustrated herein, persons of ordinary skill in the art will readily appreciate that many other methods of implementing the example machine readable instructions can alternatively be used. For example, the order of execution can be changed, and/or some of the steps described can be changed, eliminated, or combined.

Referring now to FIG. 5A, in block 500, one or more network packets can be initially received from the network 112 by the application delivery controller 110 directly or via a router (not shown) and the Ethernet link 206 as shown in FIGS. 1A, 1B, and 2. In this example, the received network packets can be in a TCP format with a header and a payload. In block 502, and as shown in FIG. 2, the network interface controller 224 reads network packet information such as the network packet type and determines the type of network packet received, in addition to other network packet information associated with the received network packets. Further in block 502, the network interface controller 224 then determines to which DMA channel, for example, DMA channels 227 and 229, the received network packets should be assigned for traffic application processing based on the network packet type or other criteria. The network packets are placed in the respective DMA channel in a first in first out (FIFO) order, although other orders, e.g., last in first out (LIFO) may also be used. In block 504, the network packets are then taken from the multiple DMA channels and sent to segmentation logic 400 or 402 shown in FIG. 4A. In block 506, the received network packets from the DMA channels 227, 229 are segmented into CPU bus packets (e.g., CPU bus packets 11a and 11b) as one or more write requests to buffer memory 218. The segmentation includes the network packets being divided by the CPU bus packet size for each respective network packet, and in block 508, a queue of the CPU bus packets each associated with a network packet is created. The now smaller CPU bus packets are placed in respective CPU bus packet buffers 450 and 470 in a first in first out order, although the CPU bus packets may be stored in other order, for example, last in first out.

In block 510, the segmented packets are then interleaved with other CPU bus packets from the buffers 450, 470 associated with each of the other multiple DMA channels 227, 229 via the interleaving logic 404 in FIG. 4A, and transmitted, for example, alternately, across the packetized CPU bus, although the CPU bus packets may be transmitted successively in the order received, or in any other order. The interleaving takes the CPU bus packets from each of the buffers 450, 470 in a round robin fashion, although other techniques of interleaving, for example, weighted round robin may be used. In block 512, the interleaved CPU bus packets are then sent on the packetized CPU bus 208 in FIG. 2. In block 514, the interleaved CPU bus packets are then received by the CPU 220 after transmission across the packetized CPU bus 208, and reassembled in buffer memory 218 into the network packets for processing by the network traffic application module 212. By way of example only, one or more application programs associated with respective DMA channels (e.g., DMA channels 227, 229) executing over the network traffic application module 212 reassemble the received constituent CPU bus packets (e.g., CPU bus packets 11a and 11b) into respective network packets.

Referring now to FIG. 5B, transmission of network packets from buffer memory 218 to network 112 (or alternatively, LAN 114) is described using example steps illustrated by blocks 520-536. In block 520, a network packet, for example, network packet 302 or 306, to be transmitted is selected by DMA channels 227 or 229, respectively. In block 522, the DMA channels 227 or 229 then create a read request, for example, Read request packet RD 302 or RD 306, corresponding to the network packet that is to be read from buffer memory 218 and transmitted out to network 112 or LAN 114.

In block 524, the read request packets RD 302 and RD 306 are segmented into smaller CPU bus read request packets, for example, CPU bus read request packets RD 11a and RD 11b shown in FIG. 4B. In this example, the segmentation can be performed by read request segmentation logic 422 or 432 depending on which DMA channel 227 or 229 the network packet requested to be read out and transmitted is associated with. In block 526, CPU bus read request packets are interleaved with CPU bus read request packets from other DMA channels.

In block 528, the interleaved CPU read request bus packets are then sent over the packetized CPU bus 208 to the host processor complex 219 shown in FIG. 2. Based upon the read request packets, CPU read completion packets (e.g., CPU read completion packets CMP 11a and CMP 11b) associated with the network packet to be read out are received along with an indication of read completion for that network packet, as shown in block 530.

In block 532, CPU bus packet read completions are demultiplexed on to requesting DMA channels. Constituent CPU bus packets are reassembled into respective network packets 302 and 306 prior to being transmitted via respective DMA channels 227 and 229, as shown in block 534. In block 536, reassembled network packets 302 and 306 are then transmitted out to network 112 or LAN 114 via network port 202 and through Ethernet link 206 shown in FIG. 2.

Having thus described the basic concepts by way of examples, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples disclosed. Additionally, the recited order of processing elements or sequences, or the use of numbers, letters, or other designations therefor, is not intended to limit the claimed processes to any order except as can be specified in the claims.

What is claimed is:

1. A method for sharing bandwidth among executing application programs comprising:
   receiving by a network traffic management device a first network packet from a first DMA channel, the first network packet having a first size;
   segmenting by the network traffic management device the received first network packet from the first DMA channel into one or more first constituent CPU bus packets;
   receiving at the network traffic management device a second network packet from a second DMA channel, the second network packet having a second size different from the first size;
   segmenting by the network traffic management device the received second network packet from the second DMA channel into one or more second constituent CPU bus packets; and
   alternately transmitting by the network traffic management device the one or more first constituent CPU bus packets from the first DMA channel and the one or more second constituent CPU bus packets from the second DMA channel across a packetized CPU bus, wherein the one or more first constituent CPU bus packets and the one or more second constituent CPU bus packets each have a same size.

2. The method of claim 1, wherein receiving the first and second network packets from the first DMA channel and the second DMA channel further comprises:
   reading by the network traffic management device network packet information from the received first and second network packets;
   determining by the network traffic management device to which DMA channel the received first and second network packets will be sent based upon the network packet information read from the first and second network packets; and
   sending by the network traffic management device the first and second network packets to one or more DMA channels based upon the network packet information.

3. The method of claim 1, wherein the first and second network packets are in a transmission control protocol (TCP) format with a header and a payload.

4. The method of claim 1, wherein the one or more first constituent CPU bus packets and the one or more second constituent CPU bus packets are HyperTransport bus packets.

5. The method of claim 1, wherein the one or more first constituent CPU bus packets and the one or more second constituent CPU bus packets are PCI Express bus packets.

6. The method of claim 1, wherein the alternatively transmitting further comprises transmitting by the network traffic management device the one or more first constituent CPU bus packets and the one or more second constituent CPU bus packets to a host processor in a round robin fashion.

7. The method of claim 1, further comprising:
   reassembling by the network traffic management device the interleaved one or more first constituent CPU bus packets and the one or more second constituent CPU bus packets after transmission across the packetized CPU bus.

8. The method of claim 7, wherein reassembling the interleaved one or more first constituent CPU bus packets and the one or more second constituent CPU bus packets on a packetized CPU bus further comprises reassembling by the network traffic management device for processing by a network application program module.

9. The method of claim 7, wherein a first application program reassembles the one or more first constituent CPU bus packets back into the first network packet from the first DMA channel, and a second application program reassembles the one or more second constituent CPU bus packets back into the second network packet from the second DMA channel.

10. The method of claim 1, wherein the executing application programs are each associated with a separate DMA channel.

11. The method of claim 1, wherein the executing application programs operate on one or more host system processors arranged within an application delivery controller interposed between clients and servers on a network.

12. A non-transitory computer readable medium having stored thereon instructions for sharing bandwidth among executing application programs, which when executed by at least one processor, causes the processor to perform steps comprising:
   receiving a first network packet from a first DMA channel, the first network packet having a first size;
   segmenting the received first network packet from the first DMA channel into one or more first constituent CPU bus packets;
   receiving at the network traffic management device a second network packet from a second DMA channel, the second network packet having a second size different from the first size;
   segmenting by the network traffic management device the received second network packet from the second DMA channel into one or more second constituent CPU bus packets; and
   alternately transmitting the one or more first constituent CPU bus packets from the first DMA channel and the one or more second constituent CPU bus packets from the second DMA channel across a packetized CPU bus, wherein the one or more first constituent CPU bus packets and the one or more second constituent CPU bus packets each have a same size.

13. The medium of claim 12, wherein receiving the first and second network packets from the first DMA channel and the second DMA channel further comprises:
   reading network packet information from the received first and second network packets;

determining to which DMA channel the received first and second network packets will be sent based upon the network packet information read from the first and second network packets; and sending the first and second network packets to one or more DMA channels based upon the network packet information.

14. The medium of claim 12, wherein the first and second network packets are in a transmission control protocol (TCP) format with a header and a payload.

15. The medium of claim 12, wherein the one or more first constituent CPU bus packets and the one or more second constituent CPU bus packets are HyperTransport bus packets.

16. The medium of claim 12, wherein the one or more first constituent CPU bus packets and the one or more second constituent CPU bus packets are PCI Express bus packets.

17. The medium of claim 12, wherein the alternatively transmitting further comprises transmitting the one or more first constituent CPU bus packets and the one or more second constituent CPU bus packets to a host processor in a round robin fashion.

18. The medium of claim 12, further having stored thereon instructions which, when executed by at least one processor, causes the processor to perform steps further comprising:
reassembling the interleaved one or more first constituent CPU bus packets and the one or more second constituent CPU bus packets after transmission across the packetized CPU bus.

19. The medium of claim 18, wherein reassembling the interleaved one or more first constituent CPU bus packets and the one or more second constituent CPU bus packets on a packetized CPU bus comprises reassembling for processing by a network application program.

20. The medium of claim 18, wherein a first application program reassembles the one or more first constituent CPU bus packets back into the first network packet from the first DMA channel, and a second application program reassembles the one or more second constituent CPU bus packets back into the second network packet from the second DMA channel.

21. The medium of claim 12, wherein the executing application programs are each associated with a separate DMA channel.

22. The medium of claim 12, wherein the executing application programs operate on one or more host system processors arranged within an application delivery controller interposed between clients and servers on a network.

23. A network traffic management apparatus comprising:
at least one of a network interface controller coupled to a processor and including logic configured to be capable of implementing or the processor coupled to a memory and configured to be capable of executing programmed instructions stored in the memory comprising:
receiving a first network packet from a first DMA channel, the first network packet having a first size;
segmenting the received first network packet from the first DMA channel into one or more first constituent CPU bus packets;
receiving at the network traffic management device a second network packet from a second DMA channel, the second network packet having a second size different from the first size;
segmenting by the network traffic management device the received second network packet from the second DMA channel into one or more second constituent CPU bus packets; and
alternately transmitting the one or more first constituent CPU bus packets from the first DMA channel and the one or more second constituent CPU bus packets from the second DMA channel across a packetized CPU bus, wherein the one or more first constituent CPU bus packets and the one or more second constituent CPU bus packets each have a same size.

24. The apparatus of claim 23, wherein receiving the network packets from the first DMA channel and the second DMA channel further comprises:
reading network packet information from the received first and second network packets;
determining to which DMA channel the received first and second network packets will be sent based upon the network packet information read from the first and second network packets; and
sending the first and second network packets to one or more DMA channels based upon the network packet information.

25. The apparatus of claim 23, wherein the first and second network packets are in a transmission control protocol (TCP) format with a header and a payload.

26. The apparatus of claim 23, wherein the one or more first constituent CPU bus packets and the one or more second constituent CPU bus packets are HyperTransport bus packets.

27. The apparatus of claim 23, wherein the one or more first constituent CPU bus packets and the one or more second constituent CPU bus packets are PCI Express bus packets.

28. The apparatus of claim 23, wherein the alternatively transmitting further comprises transmitting the one or more first constituent CPU bus packets and the one or more second constituent CPU bus packets to a host processor in a round robin fashion.

29. The apparatus of claim 23, wherein the network interface controller includes logic further configured to be capable of implementing or the processor is further configured to be capable of executing programmed instructions stored in the memory further comprising:
reassembling the interleaved one or more first constituent CPU bus packets and the one or more second constituent CPU bus packets after transmission across the packetized CPU bus.

30. The apparatus of claim 29, wherein the reassembling the interleaved one or more first constituent CPU bus packets and the one or more second constituent CPU bus packets on a packetized CPU bus comprises reassembling for processing by a network application program.

31. The apparatus of claim 29, wherein a first application program reassembles the one or more first constituent CPU bus packets back into the first network packet from the first DMA channel, and a second application program reassembles the one or more second constituent CPU bus packets back into the second network packet from the second DMA channel.

32. The apparatus of claim 23, wherein the executing application programs are each associated with a separate DMA channel.

33. The apparatus of claim 23, wherein the executing application programs operate on one or more host system processors arranged within an application delivery controller interposed between clients and servers on a network.

34. The apparatus of claim 23, wherein at least one of the processor or the logic comprises configurable hardware comprising a field programmable gate array (FPGA), an application specific integrated circuit (ASIC), a programmable logic device (PLD), or field programmable logic arrays (FPLA).

* * * * *